(12) United States Patent
Garcia Grau et al.

(10) Patent No.: US 12,454,006 B2
(45) Date of Patent: Oct. 28, 2025

(54) DETERMINING BUILD PARAMETERS IN ADDITIVE MANUFACTURING

(71) Applicant: Peridot Print LLC, Palo Alto, CA (US)

(72) Inventors: Marc Garcia Grau, Sant Cugat del Valles (ES); Michel Georges Encrenaz, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 404 days.

(21) Appl. No.: 17/758,088

(22) PCT Filed: Jan. 29, 2020

(86) PCT No.: PCT/US2020/015588
§ 371 (c)(1),
(2) Date: Jun. 28, 2022

(87) PCT Pub. No.: WO2021/154235
PCT Pub. Date: Aug. 5, 2021

(65) Prior Publication Data
US 2023/0023768 A1    Jan. 26, 2023

(51) Int. Cl.
*B22F 10/85* (2021.01)
*B22F 10/30* (2021.01)
(Continued)

(52) U.S. Cl.
CPC ............. *B22F 10/85* (2021.01); *B22F 10/30* (2021.01); *B22F 2203/05* (2013.01); *B33Y 10/00* (2014.12); *B33Y 30/00* (2014.12); *B33Y 50/02* (2014.12)

(58) Field of Classification Search
CPC ...... B22F 10/85; B22F 10/30; B22F 2203/05; B22F 10/73; B22F 10/14; B22F 10/80;
(Continued)

(56) References Cited

U.S. PATENT DOCUMENTS 11,014,296 B2 *  5/2021  De Pena ............... B29C 64/245
2017/0355137 A1 * 12/2017 Ederer .................. B29C 64/165
(Continued)

FOREIGN PATENT DOCUMENTS

CN          108213423 A        6/2018
CN          108602279 A        9/2018
(Continued)

OTHER PUBLICATIONS

Agote I., et al., "Binder Jetting Process Effects on Metal Powder Reusability", Euro PM2019—Am Printing Technologies/Binder Jetting, Jan. 1, 2019, pp. 1-6.
(Continued)

*Primary Examiner* — Thomas C Lee
(74) *Attorney, Agent, or Firm* — Michael Dryja

(57) ABSTRACT

A method is disclosed. The method involves establishing a number of times that a batch of build material has been processed as part of one or more additive manufacturing processes without forming part of a three-dimensional object formed during the one or more additive manufacturing processes. The method also involves determining, based on the established number of times, build parameters to be applied in respect of an additive manufacturing process to be performed using the batch of build material to generate a three-dimensional object.

12 Claims, 5 Drawing Sheets

(51) Int. Cl.
*B33Y 10/00* (2015.01)
*B33Y 30/00* (2015.01)
*B33Y 50/02* (2015.01)

(58) Field of Classification Search
CPC ......... B33Y 10/00; B33Y 30/00; B33Y 50/02; B33Y 50/00; Y02P 10/25
See application file for complete search history.

(56) References Cited

U.S. PATENT DOCUMENTS

| | | | |
|---|---|---|---|
| 2018/0050493 A1* | 2/2018 | Sanz Ananos | B29C 64/35 |
| 2018/0259939 A1 | 9/2018 | Garcia et al. | |
| 2018/0307209 A1* | 10/2018 | Chin | B22F 10/28 |
| 2018/0339466 A1* | 11/2018 | El Naga | B22F 10/34 |
| 2019/0084235 A1* | 3/2019 | Roure Pastor | B01F 35/832 |
| 2019/0184641 A1* | 6/2019 | Swier | B29C 64/314 |
| 2020/0114576 A1* | 4/2020 | De Pena | B33Y 30/00 |
| 2020/0223143 A1* | 7/2020 | Gurdiel Gonzalez | B29C 64/393 |
| 2021/0178696 A1 | 6/2021 | De et al. | |
| 2021/0256580 A1* | 8/2021 | Norman | G06F 30/12 |
| 2021/0331395 A1* | 10/2021 | Chanclon Fernandez | B29C 31/02 |
| 2022/0097305 A1* | 3/2022 | Erickson | G06K 19/0723 |
| 2023/0264423 A1* | 8/2023 | Barbati | B29C 64/379 700/98 |
| 2023/0373158 A1* | 11/2023 | Steege | B29C 64/165 |

FOREIGN PATENT DOCUMENTS

| | | |
|---|---|---|
| CN | 108885643 A | 11/2018 |
| EP | 3375607 A1 | 9/2018 |
| IN | 201841039261 A | 4/2019 |
| RU | 182033 U1 | 8/2018 |
| WO | 2014/167100 A1 | 10/2014 |
| WO | 2019/195062 A1 | 10/2019 |
| WO | 2019/199285 A1 | 10/2019 |
| WO | 2019/209881 A1 | 10/2019 |
| WO | 2020/079510 A1 | 4/2020 |

OTHER PUBLICATIONS

Mirzababaei, S., et al., Metal Powder Recyclability in Binder Jet Additive Manufacturing, Journal of Metals, vol. 72, No. 9, Jul. 6, 2020, pp. 3070-3079.

* cited by examiner

DETERMINING BUILD PARAMETERS IN ADDITIVE MANUFACTURING

BACKGROUND

Additive manufacturing may be used to generate three-dimensional objects on a layer-by-layer basis, by processing successive layers of build material. Print agent, such as binder agent, may be selectively applied to portions of layers of build material to cause those portions to coalesce and/or solidify. In some examples, metallic build material may be used to generate metallic three-dimensional objects.

Additive manufacturing processes may be performed using an additive manufacturing apparatus, which generate objects to a particular size, as defined in object model data. The size of the object to be generated may be varied by adjusting the object model data.

BRIEF DESCRIPTION OF DRAWINGS

Examples will now be described, by way of non-limiting example, with reference to the accompanying drawings, in which.

DETAILED DESCRIPTION

Figure 1:
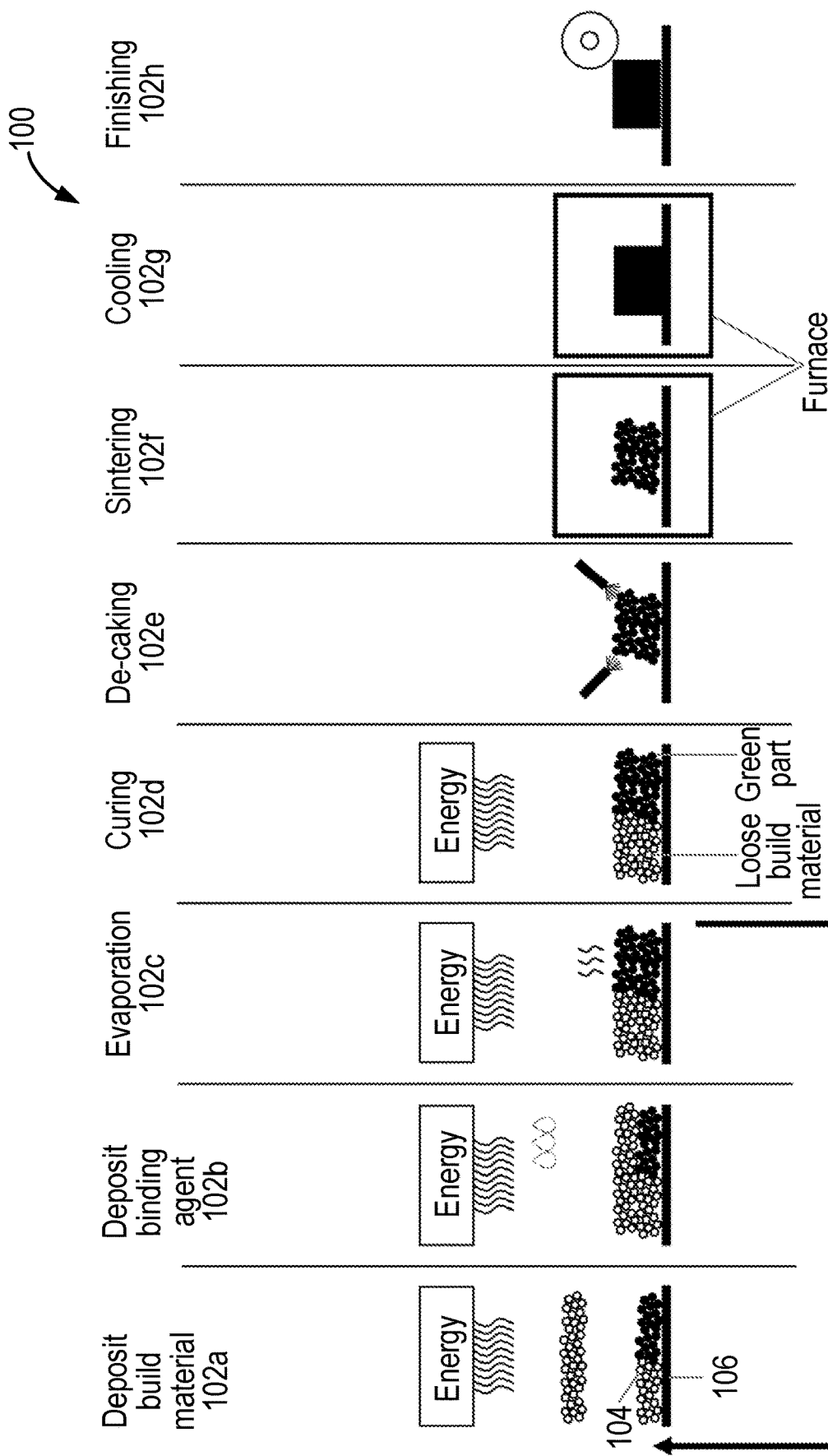
FIG. 1 is an illustration of an example of an additive manufacturing process.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a build platform and processed layer by layer, for example within a fabrication chamber. According to one example, a suitable build material may be PA12 build material commercially known as V1R10A "HP PA12" available from HP Inc. In other examples, metal powder, such as steel powder, may be used as the build material. For example, powdered steel alloy known as 316L and 17-4PH may be used for generating metal objects.

In some examples, at least one print agent may be selectively applied to the build material, and may be liquid when applied. For example, a binder agent, or binding agent, may be selectively distributed onto portions of a layer of build material in a pattern derived from data representing a slice of a three-dimensional object to be generated (which may for example be generated from structural design data). The binding agent may have a composition which absorbs energy such that, when energy (for example, heat) is applied to build material to which binding agent has been applied, the build material and binding agent are caused to become bound together to form the three-dimensional object in accordance with the design data.

Different types of binding agent may be used. In some examples, thermally curable binding agents may be used. When heat is applied to build material to which thermally curable binding agent has been applied, particles (e.g. latex particles) in the binding agent are caused to bind together, thereby binding the build material together in a binder matrix. In other examples, an ultraviolet (UV) curable binding agent may be used. When UV energy is applied to build material to which UV curable binding agent has been applied, components in the binding agent are caused to polymerize, thereby binding the build material together in a binder matrix.

According to one example, a suitable binding agent may be an ink-type formulation. In one example such a binding agent may additionally comprise a UV light absorber. In other examples, a water-based binding agent may be used. Such a binding agent may be formulated with a polymer that binds particles of metal build material together at positions where the binding agent is delivered. Capillary forces pull the binding agent into small interstices between the metal particles to produce a uniform binder distribution.

As noted above, additive manufacturing systems may generate objects based on structural design data. This may involve a designer generating a three-dimensional model of an object to be generated, for example using a computer aided design (CAD) application. The model may define the solid portions of the object.

As is apparent from the discussions herein, some additive manufacturing processes, such as those using metal powder as the build material, result in the three-dimensional object and a quantity of build material that has not solidified or coalesced to form part of the three-dimensional object. For example, build material to which binding agent has not been applied may not be bound or solidified during the additive manufacturing process and, therefore, this residual build material may remain largely in its original form. Once the three-dimensional object has been formed, the residual build material may be retrieved from the additive manufacturing apparatus so that it can be reused in a future additive manufacturing process.

It has been recognized that, when a three-dimensional object is generated using new build material (i.e. build material that has not been processed as part of an additive manufacturing process), the object may shrink (i.e. reduce in size).

It has also been recognized that, if build material has been processed as part of an additive manufacturing process, without being solidified as part of the resulting three-dimensional object, then some properties of that residual build material may change. A consequence of the change in properties is that, if that build material is used to generate a three-dimensional object, then the size of the resulting three-dimensional object is likely to reduce by less than the size reduction seen when new build material is used. Thus, it has been recognized that, in general, less shrinkage occurs in objects that are generated with build material that has been processed a greater number of times in additive manufacturing processes without forming part of the resulting three-dimensional object. As explained below, for the purpose of this disclosure, build material is considered to have been processed when it has undergone various parts of an additive manufacturing process. Examples described below enable an object to be generated having an intended size, when build material is used that has been processed a particular number of times previously. For example, the disclosed methods are applicable to build material from different batches (e.g. build material that has been used in different manufacturing processes), if the build material from those different batches has been processed the same number of times. In practice, this may be achieved by carefully removing the loose build material from the additive manufacturing apparatus, and storing it with an indication of the number of times that build material has been processed.

Examples disclosed herein provide a mechanism by which the expected amount of shrinkage of a three-dimensional object can be predicted based on the number of times that build material used in the additive manufacturing process has been processed previously. Build parameters to be used in the additive manufacturing process may then be modified such that the three-dimensional object is generated having a larger-than-intended size, to take account of the expected shrinkage. Other examples disclosed herein provide a mechanism by which the degree of shrinkage of an object may be determined based on the amount that the build material has been processed previously.

Referring to the drawings, FIG. 1 is an illustration of an example of an additive manufacturing process 100. In this example, metal powder is used as the build material, so as to generate a metallic three-dimensional object. At stage 102a of the process 100, a layer of build material (e.g. metal powder) 104 is deposited onto a build platform 106, of a fabrication chamber of an additive manufacturing apparatus. At stage 102b, binding agent 108 is a distributed onto the layer of build material 104 using an agent distributor. The binding agent 108 is deposited at positions where it is intended for the build material 104 to be bound together. In FIG. 1, build material to which binding agent has been applied is shown as black circles, while build material to which binding agent has not been applied is shown as white circles. At stage 102c (and, to some extent, during the stages 102a and 102b) of the process 100, thermal energy 110 is applied to the build material 104 to increase the temperature of build material. During stage 102c, the thermal energy applied to the build material 104 causes the water from the binding agent 108 to evaporate the from the build material. Evaporating water from the build material can help to prevent leaching of binding agent 108 into other regions of build material. In some examples, however, the evaporation stage may be omitted. After a defined period of evaporation, the stages 102a, 102b and 102c are repeated, with subsequent layers of build material 104 being deposited on top of the previous layer of build material, until a sufficient number of layers has been deposited to create what is referred to as a "pre-green part".

At stage 102d, energy (e.g. thermal energy) is applied to the build material 104 to cause particles of build materiel to bind together. In some examples, this may comprise a curing process. For example, curing may be achieved by increasing the amount of thermal energy 110 provided in the fabrication chamber. The curing process causes any residual solvent in the binding agent to evaporate, then causes particles in the binding agent to cure and bind particles of build material together. Following the curing process, the build material 104 to which binding agent 108 has been applied becomes bound or solidified, forming what is referred to as a "green part", which is a generally loosely bound matrix of particles of build material. The green part is formed once all of the build material in the fabrication chamber has been heated to a temperature exceeding the curing temperature of the binding agent for a sufficient duration. At stage 102e of the process 100, a "de-caking" process is performed, which involves removing any loose, residual build material 104 from the green part (i.e. the bound portion of build material).

Following the de-caking process, the green part remains. The build material 104 removed during the de-caking process may be removed from the fabrication chamber and stored for use in another additive manufacturing process. Build material 104 removed from fabrication chamber at the de-caking stage is considered to have been processed without forming part of the three-dimensional objection manufactured during the additive manufacturing process. Such build material, that has been processed once, may be referred to as second generation (or second revision) build material. Thus, new, un-used build material may be referred to as first generation build material. A batch of second generation build material may be used in another additive manufacturing process and, in some examples, a multiple batches of second generation build material may be combined together and used in an additive manufacturing process. Again, some or all of the second generation build material that is processed and does not form part of the resulting three-dimensional object may be retrieved and used in a future additive manufacturing process. Such build material that has been processed twice without forming part of the resulting object may be referred to as third generation (or third revision) build material. Build material that has been processed three times without forming part of the resulting object may be referred to as fourth generation (or fourth revision) build material, and so on.

The reduction in the amount of object shrinkage occurring when higher-generation build material is used is a consequence of the build material undergoing the evaporation process (block 102c) and the curing process (block 102d). The reduction of water resulting from these processes is understood to affect capillarity within the build material, thereby reducing the amount of shrinkage that will occur.

Referring again to FIG. 1, at stage 102f, the green part is placed into a furnace at a high temperature to be sintered. In some examples, sintering involves heating the green part to a particular temperature which is dependent on the nature of the build material being used, and this causes the material in the green part to solidify and compact, without melting. At stage 102g, following sintering, the resulting three-dimensional object is allowed to cool. A finishing process (e.g. mechanical or chemical polishing, painting, and the like) may be performed in respect of the object at stage 102h of the process 100.

Figure 2:
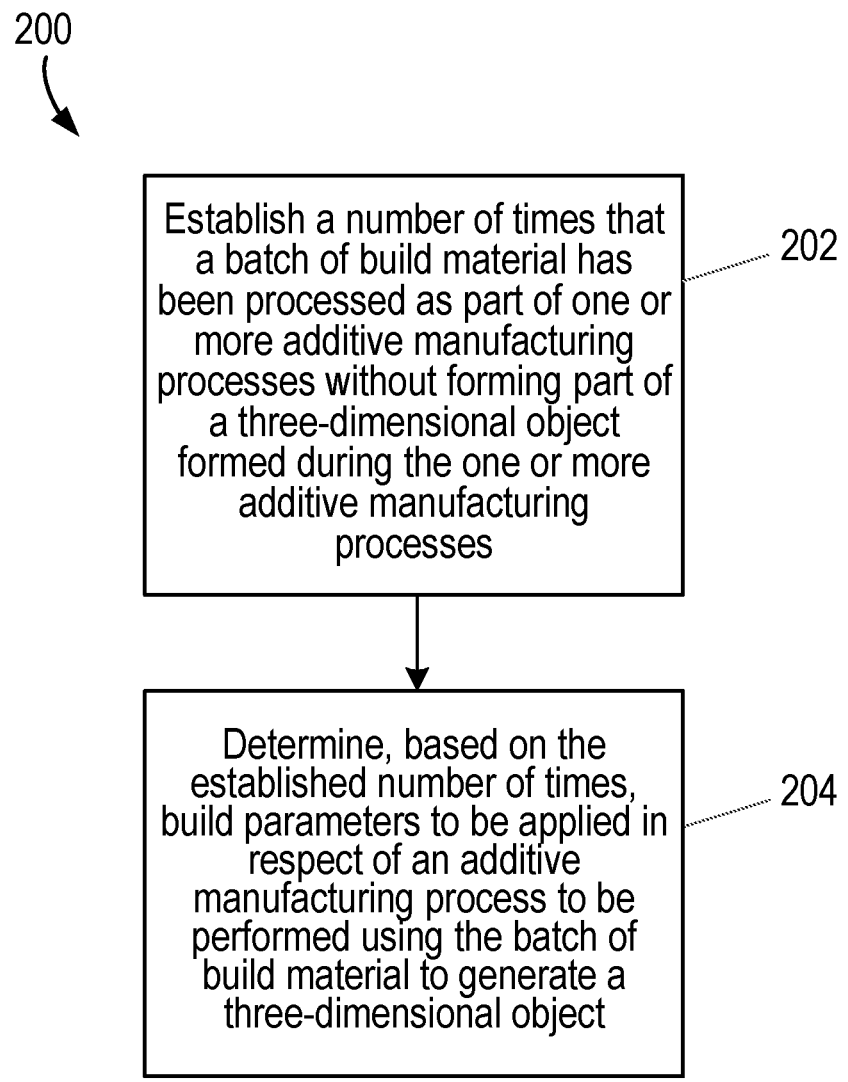
FIG. 2 is a flowchart of an example of a method of determining build parameters for an additive manufacturing process.

FIG. 2 is a flowchart of a method 200, which may be considered to be a method of determining build parameters for an additive manufacturing process. The method 200 may, for example, comprise a computer-implemented method. At block 202, the method 200 comprises establishing a number of times that a batch of build material has been processed as part of one or more additive manufacturing processes without forming part of a three-dimensional object formed during the one or more additive manufacturing processes. The number of times that a batch of build material be processed may, for example, be recorded and indicated on a container in which the build material is stored. In some examples, it may be possible to determine the number of times that a particular batch of build material has been processed in some other way. In some examples, the number of times that a batch of build material has been processed as part of one or more additive manufacturing processes without forming part of a three-dimensional object formed during the one or more additive manufacturing processes may be defined as the number of times that a batch of build material has been recovered (for reuse) after having undergone the evaporation and curing processes of the additive manufacturing process.

The method 200 comprises, at block 204, determining, based on the established number of times, build parameters to be applied in respect of an additive manufacturing process to be performed using the batch of build material to generate a three-dimensional object. The build parameters determined at block 204 may, for example, comprise parameters defining the size of the three-dimensional object to be manufactured. In particular, the determined build parameters may comprise parameters defining the size or extent of a particular dimension (e.g. width, height, length, depth, volume and the like) or of multiple dimensions of part or all of the object to be generated during the process.

As noted above, an object manufactured from build material that has previously been used in an additive manufacturing process (i.e. build material that has been processed part of such a process without forming part of the resulting three-dimensional object), referred to as second-(or higher-) generation build material, may experience less shrinkage than an object manufactured from new, or first-generation build material. Thus, a three-dimensional object generated using brand-new build material can be expected to shrink once the additive manufacturing process has been completed. Therefore, in order to generate the object at a particular, intended size, the build parameters for the additive manufacturing process may be determined in such a way that the object is generated initially at a size larger than intended such that, following the expected shrinkage, the object will be at its intended size. Thus, if it is intended that a particular portion of an object to be generated is to have a length X mm after shrinkage, then the build parameters for the additive manufacturing process may be determined such that the green part is generated slightly larger, so that the particular portion of the green part initially has a length X+d mm where d is equivalent to the amount of shrinkage that the particular portion is expected to undergo during or following sintering (e.g. stage 102f in FIG. 1), based on the number of times that the build material has been processed previously. Put another way, the additive manufacturing process may involve generating a three-dimensional object having a dimension of a defined size, and determining (at block 204) the build parameters may comprise determining build parameters that enable the three-dimensional object (e.g. the green part) to be generated initially with the dimension larger than the defined size. The shrinkage affects all of the build material forming the object, so the build parameters are determined to increase the size of the entire object (i.e. all dimensions of the object). For example, a general object scaling adjustment may be applied.

In other examples, a build material may have the opposite effect. For example, an object formed from a particular type of build material may increase in size following its generation. In such cases, build parameters may be determined that cause a green part to be generated with dimensions smaller than the intended final size to be achieved, such that the intended size is reached after the object grows.

It is to be noted that the expected shrinkage amount for a particular generation of build material is specific to a particular type of build material. Thus, the shrinkage amount for second generation steel alloy 316L may be different from the shrinkage amount for second generation steel alloy 17-4PH.

In some examples, build parameters of an object to be generated (e.g. parameters defining the size of the object) may be determined to take account of another effect that is seen to occur in additive manufacturing processes. Due to manufacturing tolerances of additive manufacturing apparatuses, and due to the manner in which print agent (e.g. binding agent) is deposited onto layers of build material, objects may be generated having a size which is larger than the size defined in the build parameters. More particularly, binding agent may be delivered in regions extending beyond the intended boundaries (e.g. external boundaries of the object and internal boundaries defining holes, channels and cavities within the object. In other words, a resulting three-dimensional object may generally be larger than planned in the object model data used to generate the object. Reasons for the larger object size include the way in which binding agent is deposited as the agent distributor moves in an x-direction across the layer of build material, and the way in which binding agent may spread beyond the intended boundaries of the object being generated, thereby causing a larger amount of build material to become bound. It has been recognized that, in some cases, the increase in size of the object in the x-direction (i.e. in the direction that the agent distributor scans across the build platform during while is deposits print agent) may be greater than the increase in size of the object in the y-direction (i.e. in the direction perpendicular to the scanning direction of the agent distributor.

To account for this increase in object size, build parameters may be determined or adjusted to cause some dimensions of the object to be generated with a smaller size, wherein the reduction in size corresponds to the size increases discussed above. For example, adjustments may be made to take account of the increased size of the object in the x-direction, and other adjustments may be made to take account of the increased size of the object in the y-direction. The process of reducing the size of the object in this way may be referred to as "erosion". Thus, to compensate for the change in object size, erosion of the object in the x-direction may be greater than erosion of the object in the y-direction.

The amount of erosion applied to the object, both in the x direction and the y direction in respect of each layer of build material to be processed may, according to examples disclosed herein, also be adjusted according to the shrinkage expected to occur as a result of the number of times that he build material has been processed previously. For example, an object generated using new, first generation build material may be expected to shrink, so the amount of erosion to be applied to the object may be less than for an object to be generated using 15th-generation build material, which is likely to shrink by a smaller amount.

In an example, m may denote the amount of shrinkage of an object for a given generation of build material, such that $m_x$ denotes the shrinkage in the x-direction and $m_y$ denotes the shrinkage in the y-direction. The amount of object shrinkage as a consequence of newer build material being used is seen to be approximately the same in the both the x-direction and the y-direction. Thus, the adjusted or increased dimension extending in the x-direction,)$X_{adjust}$, (taking into account the expected shrinkage) may be given by:

$$X_{adjust} = \frac{X_{CAD}}{1 + m_x}$$

where $X_{CAD}$ is the original dimension as defined in the object model data (e.g. a CAD model). Thus, if the shrinkage $m_x$ is determined to be −0.004, and an object is to be generated having a width (in the x-direction) of 10 mm then, to account for the expected shrinkage, the object is to be generated with a dimension $X_{adjust}$ of 10.04 mm.

As noted above, the expected shrinkage in the y-direction is the same as the expected shrinkage in the x-direction, so the adjusted or increased dimension extending in the y-direction, Y adjust, (taking into account the expected shrinkage) may be given by:

$$Y_{adjust} = \frac{Y_{CAD}}{1 + m_y}$$

where $Y_{CAD}$ is the original dimension as defined in the object model data.

The amount by which the erosion (i.e. the size reduction) that is to be applied to the object is adjusted may be determined in a similar way. As noted above, the erosion to be applied is different in the x- and y-directions. Thus, the adjusted erosion in the x-direction, $X_{erosion}$, may be given by:

$$X_{erosion} = \frac{n_x}{1 + m_x}$$

where $n_x$ is the measured increase in size of the generated object in the x-direction. Similarly, the adjusted erosion in the y-direction, $Y_{erosion}$, may be given by:

$$Y_{erosion} = \frac{n_y}{1 + m_y}$$

where $n_y$ is the measured increase in size of the generated object in the y-direction.

In an example, measurement of a generated object may reveal that the object is 100 μm larger in the x-direction than planned according to the object model data (i.e. $n_x$=100 μm), and the object is 40 μm larger in the y-direction than planned according to the object model data (i.e. $n_y$=40 μm). Therefore, the calculated adjusted erosion amounts, $X_{erosion}$ and $Y_{erosion}$ are different to account for the difference in erosion in the two directions, and to account for the shrinkage based on the previous build material usage.

Figure 3:
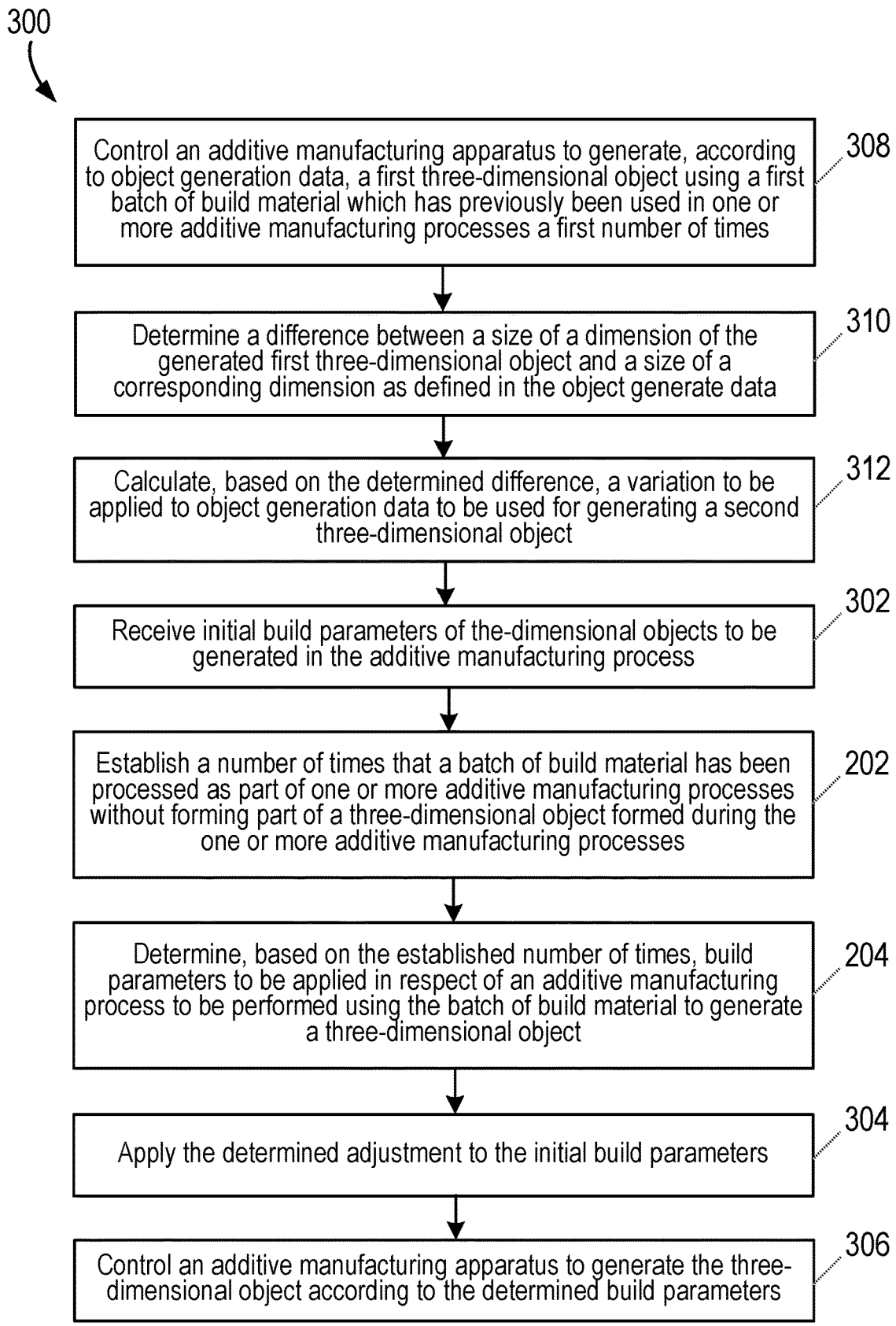
FIG. 3 is a flowchart of a further example of a method of determining build parameters for an additive manufacturing process.

The resulting dimensions to be defined in the build parameters and to be used by the additive manufacturing apparatus to generate the object of the intended size (after all adjustments have been made) are given by:

$X_{build} = X_{adjust} - X_{erosion}$, and
$Y_{build} = Y_{adjust} - Y_{erosion}$ FIG. 3 is a flowchart of a further example of a method 300, which may be considered to be a method of determining build parameters for an additive manufacturing process. The method 300 may comprise a computer-implemented method, and may include a block or blocks of the method 200 described above. The method 300 may comprise, prior to block 202, a block 302, which involves receiving initial build parameters of the three-dimensional object to be generated in the additive manufacturing process. The initial build parameters may, for example, comprise parameters defining the intended size of the object after shrinkage. Such initial build parameters may be included in object generation data, or model data, defining the object to be generated, for example in the form of a 3MF file. In cases where initial build parameters are available, determining the build parameters (at block 204) may comprise determining an adjustment to be applied to the initial build parameters.

The adjustment to be applied to the initial build parameters may correspond to an increase in a size of a dimension of the three-dimensional object to be generated. The increase in size of the dimension may be relative to the initial build parameters. In other words, the determined build parameters may define a dimension of the object to be larger than the dimension of the object as defined in the initial build parameters, thereby compensating for the expected shrinkage to occur in respect of the object and, more particularly, in respect of that dimension of the object.

At block 304, the method 300 may comprise applying the determined adjustment to the initial build parameters. For example, if it is determined that a size of a dimension defined in the initial build parameters is to be increased by 0.1%, then, at block 302, a 0.1% increase of the size of dimension is applied to the initial build parameters, thereby determining the build parameters (i.e. adjusted build parameters) of block 204.

The method 300 may comprise, at block 306, controlling an additive manufacturing apparatus to generate the three-dimensional object according to the determined build parameters. For example, the additive manufacturing apparatus may perform the stages 102 of the process 100 discussed above in order to generate a three-dimensional object according to the determined build parameters. The three-dimensional object would thus be generated slightly larger than intended (and slightly larger than defined in the initial build parameters) in order to take account of and compensate for any shrinkage expected to occur as a result of lower-generation build material being used. It will be understood that, if higher-generation build material (e.g. 15th-generation build material) is to be used to generate an object, then relatively little shrinkage may be expected to occur and, accordingly, the build parameters determined that 204 may define the size of the dimensions of the object very similar to, or identical to the ultimate intended size, assuming that little or no shrinkage will occur. Similarly, if initial build parameters are provided in such a case, then little or no adjustment of the initial build parameters may be made if little or no shrinkage of the object is expected.

The shrinkage of objects generated using additive manufacturing processes has been discussed herein in the context of metallic objects being generated using metal powder. Thus, in such examples, the build material may comprise metallic build material, such as the steel alloys mentioned above. However, the examples disclosed herein are also relevant, and may also be applied, to additive manufacturing processes in which non-metallic build material is used. For example, build material formed from a plastics material or ceramic may be used.

Various examples disclosed herein relate to the mechanism by which the appropriate build parameters (or adjustment to initial build parameters) for a particular generation of build material can be determined. For example, a determination may be made that, for first-generation build material, an object is to be generated 0.2% larger than its intended final size, for second-generation build material, an object is to be generated 0.15% larger than its intended final size, for third-generation build material, an object is to be generated 0.1% larger than its intended final size, and so on. The percentages mentioned here are merely examples. Thus, prior to performing blocks 202 and 204 of the method 200 discussed above, measurements may be made and used to determine appropriate parameters depending on the generation of build material to be used.

Thus, prior to establishing the number of times that a batch of build material has been processed as part of one or more additive manufacturing processes (in block 202), the method 300 may comprise, at block 308, controlling an additive manufacturing apparatus to generate, according to object generation data, a first three-dimensional object using a first batch of build material which has previously been used in one or more additive manufacturing processes a first number of times. For example, object generation data defining a pyramid-shaped object may be used to generate a three-dimensional pyramid using a first batch of build material. The first batch of build material may have been used previously in one additive manufacturing process (i.e. the first number of times in this example is 1), meaning the first batch build material is second-generation build material. At block 310, the method 300 may comprise determining a difference between a size of a dimension of the generated first three-dimensional object and a size of a corresponding dimension as defined in the object generation data. Thus, a dimension (e.g. the height of the pyramid) in the first pyramid is measured and compared with the corresponding measurement defined in the object generation data used to generate the first pyramid. The difference between the measurements (which is caused by the shrinkage) is determined. At block 312, the method 300 comprises calculating, based on the determined difference, a variation to be applied to object generation data to be used for generating a second three-dimensional object. Calculating the variation to be applied involves calculating a compensation factor that will take account of the difference between the size of the corresponding dimensions in the first object and the object generation data, resulting from the shrinkage. The variation to be applied may take into account the shrinkage of the object itself and a variation to the intended erosion to be applied, as discussed above.

Once the variation has been calculated at block 312, it can be applied when determining build parameters for generating a new three-dimensional object, or when adjusting initial build parameters. Thus, determining the build parameters (at block 204) may comprise determining build parameters based on the calculated variation.

Blocks 308, 310 and 312 of the method 300 may be performed separately from the other blocks of the method 300. As such, blocks 308, 310 and 312 may form part of a separate method.

Blocks of the methods 200, 300 disclosed herein may be performed by or using a processor or multiple processors. The processors may form part of a computing device, such as a desktop computer, a laptop computer, a workstation, a tablet computer or a smartphone or part of a remote server forming part of a cloud computing environment. In some examples, blocks of the methods 200, 300 may be performed using an apparatus, such as an additive manufacturing apparatus.

Figure 4:
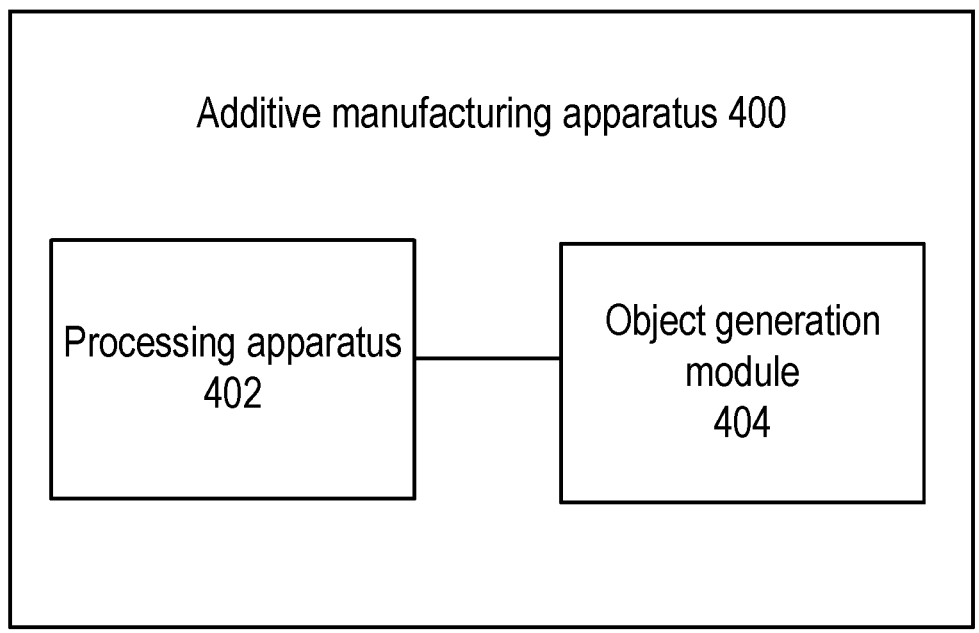
FIG. 4 is a schematic illustration of an additive manufacturing apparatus.

FIG. 4 is a schematic illustration of an example of an additive manufacturing apparatus 400 which may, in some examples, be used to perform blocks of the methods 200, 300 disclosed herein. The additive manufacturing apparatus 400 comprises processing apparatus 402 and an object generation module 404 in communication with the processing apparatus. The processing apparatus 402 is to receive data defining a number of times that a quantity of build material has been processed as part of one or more previous additive manufacturing processes, without becoming solidified as part of three-dimensional object being manufactured. The data may, in some examples, be provided by a user or operator while, in other examples, processing apparatus 402 may determine the number of times that the quantity of build material has been processed using some other technique. The processing apparatus 402 is also to determine, based on the received data, a set of parameters to be applied in respect of an additive manufacturing process to generate a three-dimensional object using the quantity of build material. The set of parameters determined by the processing apparatus 402 may comprise the build parameters discussed above, as determined at block 204.

The object generation module 404 is to generate the three-dimensional objects based on the set of parameters. Thus, once the processing apparatus 402 has determined the set of parameters to be applied, the processing apparatus may control or operate the object generation module to generate the three-dimensional object according to the set of parameters, causing the generation of the three-dimensional object from the quantity of build material.

In some examples, it may be intended that the three-dimensional object is to be generated having a dimension of a defined size. The processing apparatus 402 may determine the set of parameters in such a way that the three-dimensional object is to be generated initially with the dimensions larger than the defined size. Thus, by generating the object slightly larger than the intended resulting size, any shrinkage that may occur in the object may be compensated for such that the size of the object, after shrinkage, is as intended.

In some examples, the processing apparatus 402 may be to receive an initial set of parameters to be applied in respect of the three-dimensional object to be generated in the additive manufacturing process. As noted previously, the initial set of parameters may be defined in object generation data, which may be provided in the form of an additive manufacturing file format (e.g. the 3MF file format). The processing apparatus 402 may be to determine the set of parameters by determining a modification to be applied to the initial set of parameters. The modification to be applied to the initial set of parameters may correspond to the expected amount of shrinkage to occur in the three-dimensional object once generated.

As will be clear from the above discussion, the modification to be applied to the initial set of parameters may, in some examples, correspond to an increase in a size of a dimension of the three-dimensional object to be generated. The processing apparatus 402 of the additive manufacturing apparatus 400 may, in some examples, be to apply the determined modification to the initial set of parameters once the modification has been applied to the initial set of parameters, thereby providing the set of parameters to be used in the additive manufacturing process, the set of parameters may be used to generate the three-dimensional object.

Figure 5:
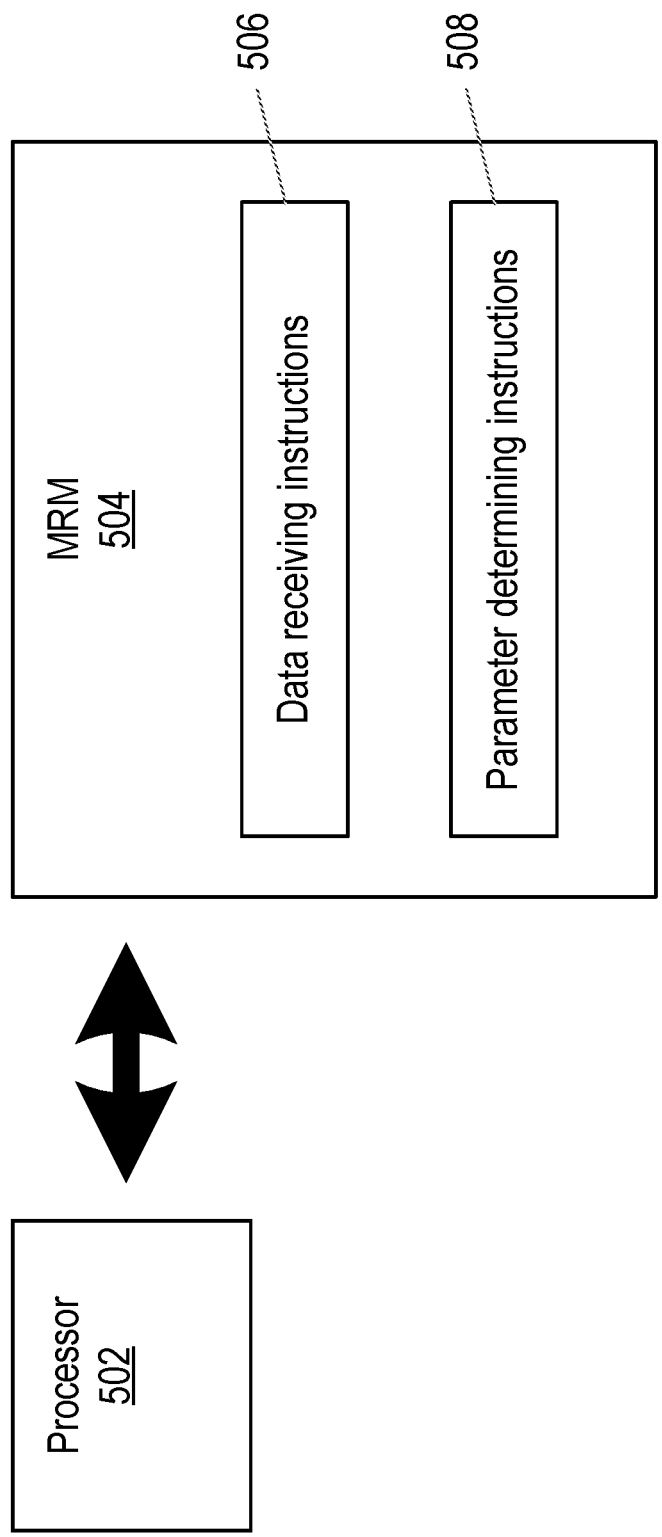
FIG. 5 is a schematic illustration of a machine-readable medium in communication with a processor.

The present disclosure also relates to a machine-readable medium. FIG. 5 is a schematic illustration of an example of a processor 502 in communication with a machine-readable medium 504. The machine-readable medium 504 comprises instructions which, when executed by processor 502, may cause the processor to perform blocks of the methods disclosed herein. In some examples, the machine-readable medium 504 comprises instructions (e.g. data receiving instructions 506) which, when executed by the processor 502, cause the processor to determine a degree of previous usage of a quantity of build material, wherein the degree of previous usage includes an indication of an amount that the quantity of build material has been through one or more additive manufacturing processes without forming part of a resulting three-dimensional object intended to be formed during the one or more additive manufacturing processes. The degree of previous usage of the quantity of build material may, for example, comprise the number of times that the quantity of build material has been processed as part of one or more additive manufacturing processes without forming part of a three-dimensional object formed during the one or more additive manufacturing processes. The machine-readable medium 504 comprises instructions (e.g. parameter determining instructions 508) which, when executed by the processor 502, cause the processor to determine, based on the degree of previous usage, parameters to be used by an additive manufacturing apparatus in respect of an additive manufacturing process to generate a three-dimensional object using the quantity of build material. The parameters determined by the processor 502 may comprise the build parameters discussed herein.

The machine-readable medium 504 may comprise instructions (e.g. model data receiving instructions) which, when executed by the processor 502, cause the processor to receive model data defining initial parameters of the three-dimensional object to be generated in the additive manufacturing process. When such model data is received, the processor may determine the parameters by determining an adjustment to be applied to the initial parameters defined in the model data.

The machine-readable medium 504 may comprise instructions which, when executed by the processor 502, cause the processor to perform various blocks of the methods disclosed herein.

Thus, examples of the present disclosure provide a mechanism by which the previous usage of a volume of build material (i.e. the number of times that the volume of build material has been processed as part of an additive manufacturing process) can be related to the amount of shrinkage that occurs in three-dimensional objects generated using the build material, such that an appropriate compensation can be applied to take account of the shrinkage. In this way, when it is intended to generate an object of a particular size, modifications to the object generation data can be made because the object to be generated slightly larger than intended, such that, after the object has shrunk by the expected amount, the final object is of the intended size. Applying the methods disclosed herein may result in more three-dimensional objects being generated as intended (e.g. having the intended size), so objects can be generated more consistently and uniformly, resulting in less wastage of build material, time and resources, and reducing the number of post-processing operations that are to be performed.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, by a processor, a model for an object to be fabricated via an additive-manufacturing process in which:
   on a layer-by-layer basis, build material powder is deposited and then binding agent is selectively applied onto the build material powder and cured to selectively bind the build material powder, to generate the object in green form;
   the object in green form is decaked to remove the build material powder that was deposited but which is not part of the object in green form; and
   the object in green form is sintered to harden the build material powder that remains, to generate the object in final form;
   causing an additive-manufacturing apparatus to generate, the object using a batch of the build material powder that has been previously used during fabrication of other objects via the additive-manufacturing process but which were not part of the other objects;

determining a difference between a size of a dimension of the generated object and a size of a corresponding dimension as defined in object generation data;

calculating, based on the determined difference, a variation to be applied to the object generation data to be used for generating the object again;

determining, by the processor, a sintering adjustment correction based on the calculated variation, wherein the sintering adjustment correction accounts for a size change in the other object last fabricated using the batch that results during sintering, applying, by the processor, the sintering adjustment correction to the model for the object to generate a corrected model; and causing, by the processor, the additive-manufacturing apparatus to generate the object again in accordance with the correction model.

2. The method according to claim 1, wherein the additive-manufacturing process involves generating the object having a dimension of a defined size, and wherein determining the sintering adjustment correction comprises determining the sintering adjustment correction that enables the object to be generated initially with the dimension larger than the defined size.

3. The method according to claim 1, wherein the sintering adjustment correction to be applied corresponds to an increase in a size of the dimension of the object to be generated.

4. The method according to claim 1, wherein the build material comprises metallic build material.

5. A system comprising:
a memory storing instructions; and
a processor configured to execute the instructions to:
receive a model for an object to be fabricated via an additive-manufacturing process in which:
on a layer-by-layer basis, build material powder is deposited and then binding agent is selectively applied onto the build material powder and cured to selectively bind the build material powder, to generate the object in green form;
the object in green form is decaked to remove the build material powder that was deposited but which is not part of the object in green form; and
the object in green form is sintered to harden the build material powder that remains, to generate the object in final form;
cause an additive-manufacturing apparatus to generate, the object using a batch of the build material powder that has been previously used during fabrication of other objects via the additive-manufacturing process but which were not part of the other objects;
determine a difference between a size of a dimension of the generated object and a size of a corresponding dimension as defined in object generation data;
calculate, based on the determined difference, a variation to be applied to the object generation data to be used for generating the object again;
determine a sintering adjustment correction based on the calculated variation, wherein
the sintering adjustment correction accounts for a size change in the other object last fabricated using the batch that results during sintering,
apply the sintering adjustment correction to the model for the object to generate a corrected model; and
cause the additive-manufacturing apparatus to generate the object again in accordance with the correction model.

6. The system according to claim 5, wherein the additive-manufacturing process involves generating the object having a dimension of a defined size, and wherein the processor is to determine the sintering adjustment correction by determining the sintering adjustment correction that enables the object to be generated initially with the dimension larger than the defined size.

7. The system according to claim 5, wherein the sintering adjustment correction to be applied corresponds to an increase in a size of the dimension of the object to be generated.

8. The system according to claim 5, wherein the build material comprises metallic build material.

9. A non-transitory machine-readable medium storing instructions executable by a processor to:
receive a model for an object to be fabricated via an additive-manufacturing process in which:
on a layer-by-layer basis, build material powder is deposited and then binding agent is selectively applied onto the build material powder and cured to selectively bind the build material powder, to generate the object in green form;
the object in green form is decaked to remove the build material powder that was deposited but which is not part of the object in green form; and
the object in green form is sintered to harden the build material powder that remains, to generate the object in final form;
cause an additive-manufacturing apparatus to generate, the object using a batch of the build material powder that has been previously used during fabrication of other objects via the additive-manufacturing process but which were not part of the other objects;
determine a difference between a size of a dimension of the generated object and a size of a corresponding dimension as defined in object generation data;
calculate, based on the determined difference, a variation to be applied to the object generation data to be used for generating the object again;
determine a sintering adjustment correction based on the calculated variation, wherein
the sintering adjustment correction accounts for a size change in the other object last fabricated using the batch that results during sintering,
apply the sintering adjustment correction to the model for the object to generate a corrected model; and
cause the additive-manufacturing apparatus to generate the object again in accordance with the correction model.

10. The non-transitory machine-readable medium according to claim 9, wherein the additive-manufacturing process involves generating the object having a dimension of a defined size, and wherein the processor is to determine the sintering adjustment correction by determining the sintering adjustment correction that enables the object to be generated initially with the dimension larger than the defined size.

11. The non-transitory machine-readable medium according to claim 9, wherein the sintering adjustment correction to be applied corresponds to an increase in a size of the dimension of the object to be generated.

12. The non-transitory machine-readable medium according to claim 9, wherein the build material comprises metallic build material.

\* \* \* \* \*